J. J. LYNN.
CARGO VESSEL.
APPLICATION FILED JUNE 14, 1916.

1,307,983.

Patented June 24, 1919.
5 SHEETS—SHEET 1.

Inventor:
James J. Lynn

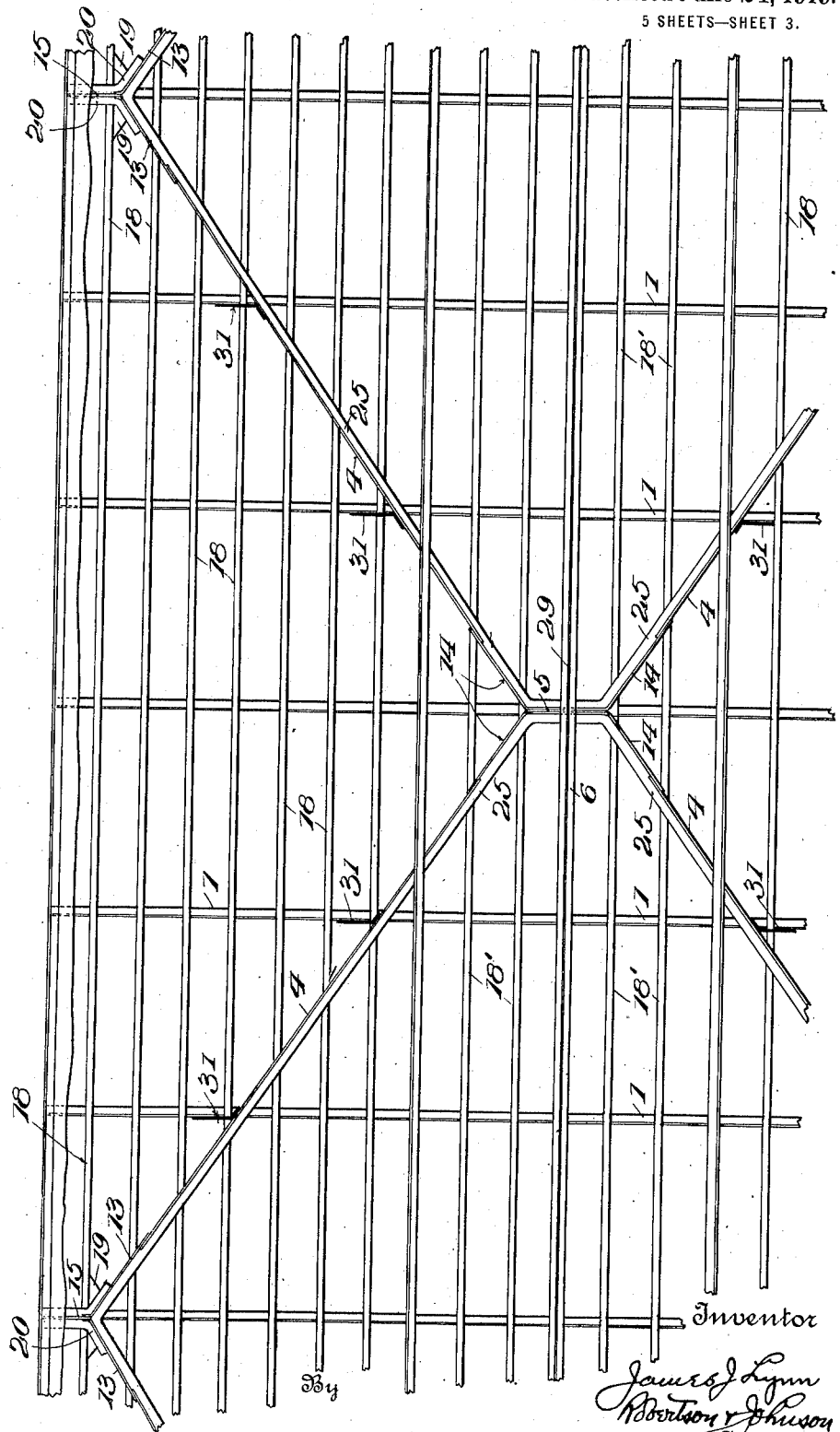

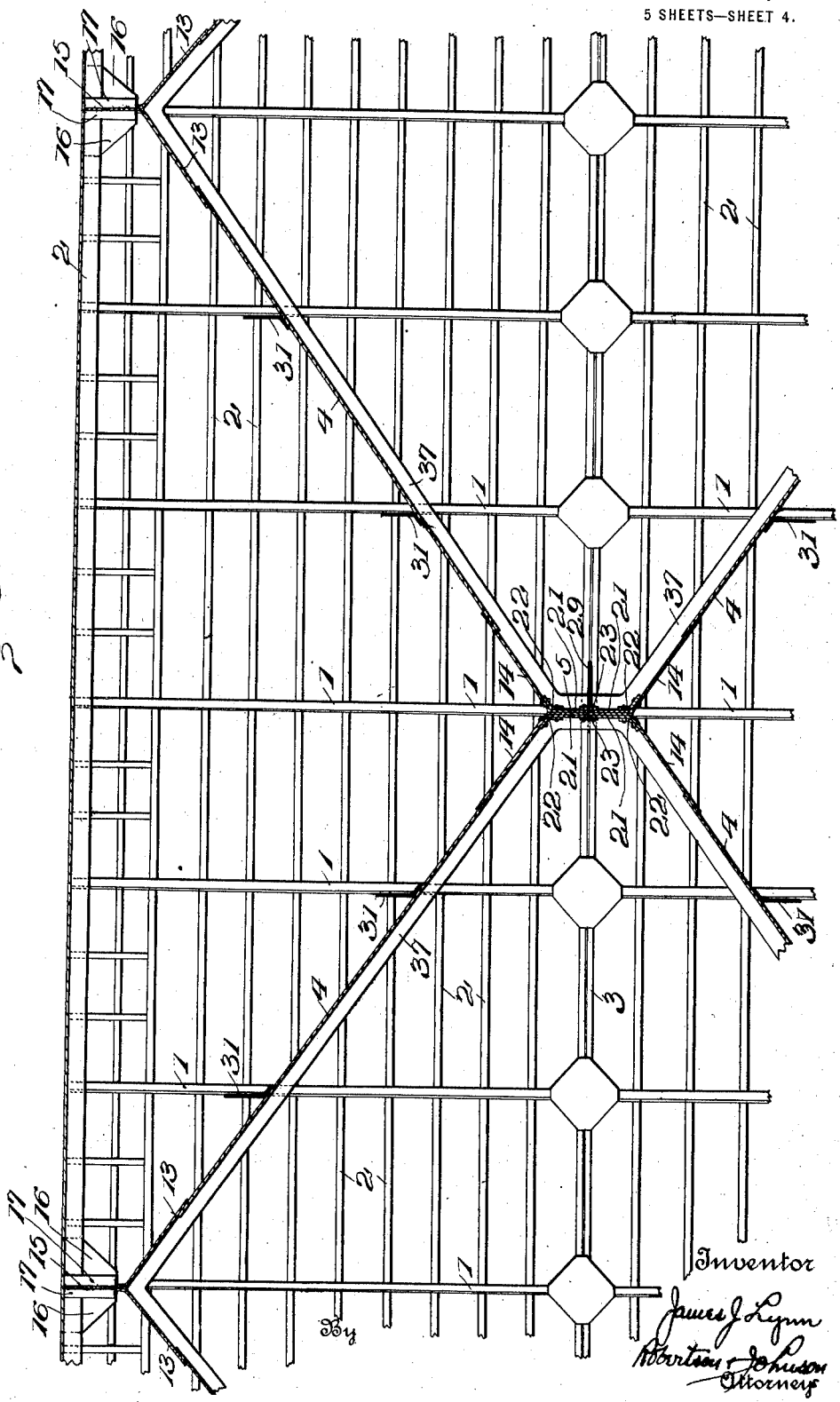

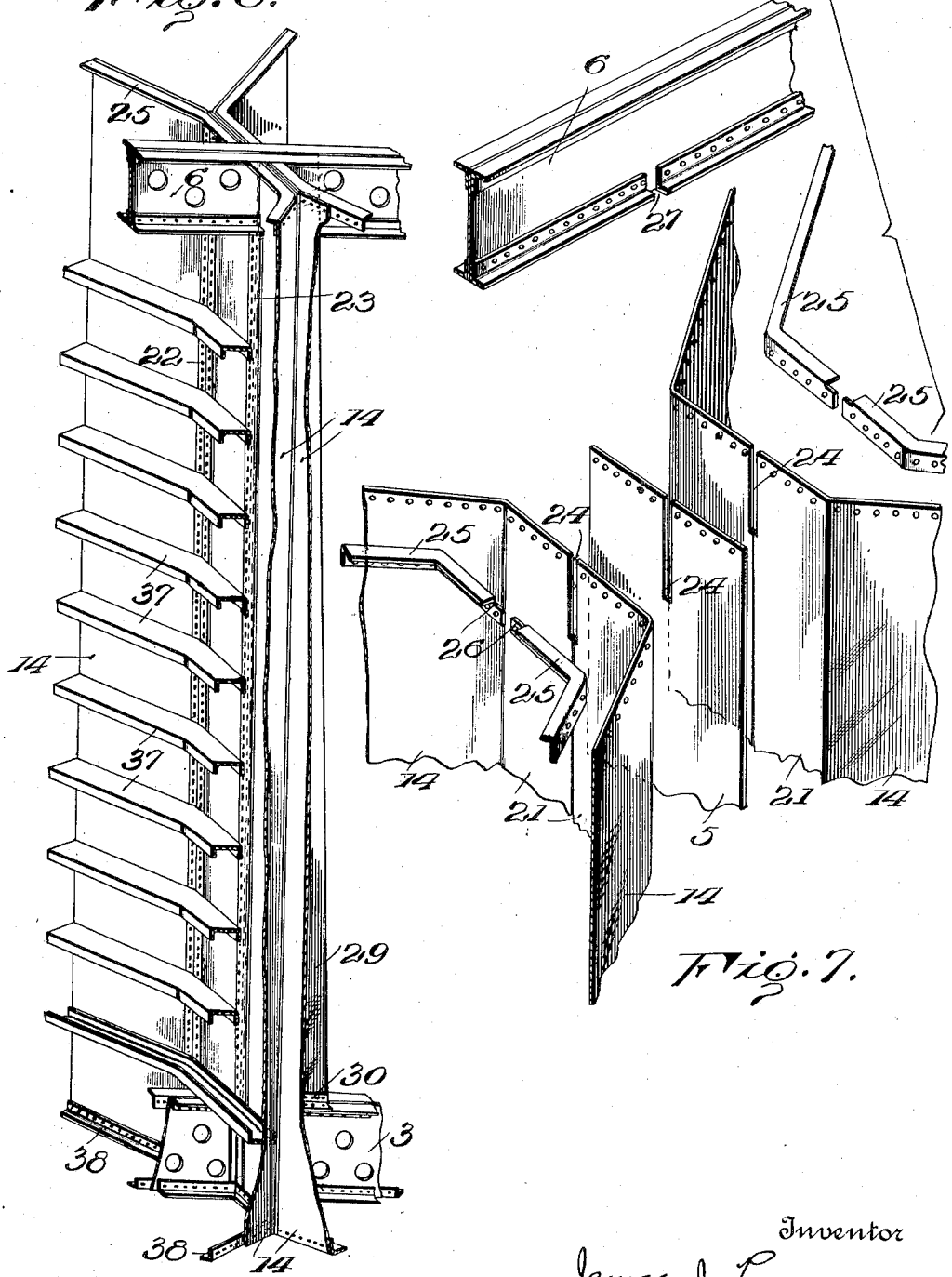

UNITED STATES PATENT OFFICE.

JAMES J. LYNN, OF PORT HURON, MICHIGAN.

CARGO VESSEL.

1,307,983.   Specification of Letters Patent.   Patented June 24, 1919.

Application filed June 14, 1916. Serial No. 103,669.

*To all whom it may concern:*

Be it known that I, JAMES J. LYNN, a citizen of the United States of America, and a resident of Port Huron, county of St. Clair, and State of Michigan, have invented certain new and useful Improvements in Cargo Vessels, of which the following is a specification.

My invention relates to cargo vessels in which class of ships it is desirable to so divide the cargo hold as to give the shipper the opportunity to transport many different grades or kinds of cargo. This object I accomplish by employing slanting or diagonal bulkheads in contra-distinction to the usual arrangement in which a central, longitudinal bulkhead and transverse bulkheads at right angles thereto are employed. My arrangement effects a material saving in cost of construction and in weight over the old type just referred to as well as a great increase in strength and stiffness since each of the slanting bulkheads crosses the planes of a number of transverse frames as well as the planes of a large number of longitudinals which makes it possible to build in the bulkheads so securely that the parts cannot move in rough weather and can be readily braced against strains. A symmetrical structure may be secured by running the slanting bulkheads from opposite frames inward to center stanchions and back to opposite frames throughout the major portion of the cargo hold.

My invention therefore consists in the cargo vessel set forth in the claims appended hereto and one embodiment of which is illustrated in the drawings and described in the specification.

Referring to the drawings:

Fig. 4 is a deck plan showing the relative location of the bulkheads to the transverse frames, longitudinals, etc.

Fig. 5 is a bottom plan corresponding to Fig. 4.

Fig. 6 is a perspective showing the preferred central structure where the slanting bulkheads meet, and Fig. 7 is a detail perspective view showing elements in Fig. 5 separated for purposes of illustration.

Figure 1:
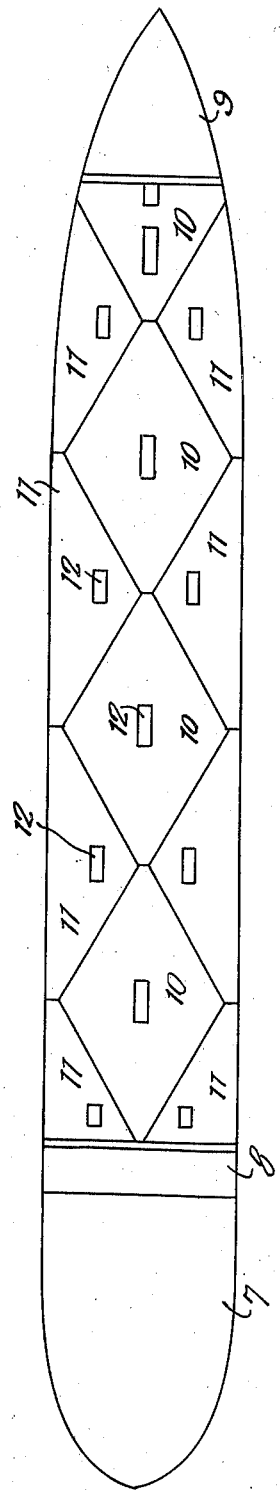
Figure 1 is a diagrammatic plan view showing the manner in which I prefer to divide the cargo hold by the use of my slanting bulkheads.
Figure 2:
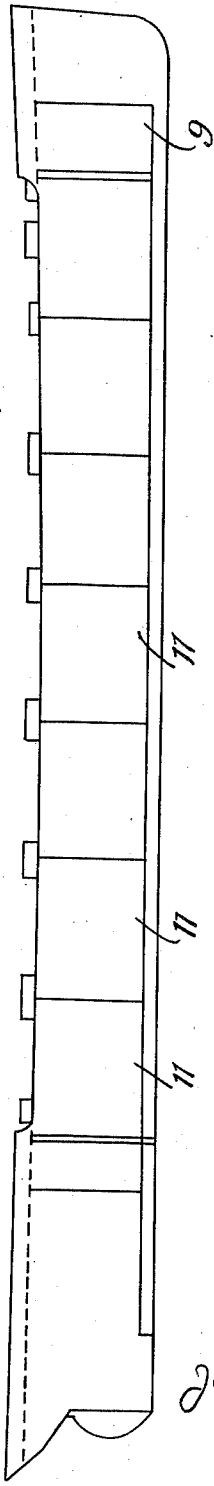
Fig. 2 is a diagrammatic elevation corresponding to Fig. 1.

It will be understood that my invention is applicable to various methods of framing and may be employed with what is known as the ordinary framing, although illustrated in the drawings as applied to the Isherwood type. The framing need not be described in detail except in so far as may be necessary to a clear understanding of my invention. In the drawings, 1 represents the transverse frames or transverses, 2 the longitudinals, the former being punched out to permit the latter to pass through, and 3 the keelson. I secure the bulkheads 4 to the framing adjacent the sides of the vessel and run them inward in planes intersecting the planes both of the longitudinals and the transverses to points adjacent the center, and I find the best arrangement to be one in which pairs of the bulkheads are secured to opposite frames and diverge therefrom to center stanchions, a series of which is provided less in number than the number of the transverse frames, the said stanchions being shown as stiff plates or uprights 5 secured at the bottom to the keelson and at the top to the center girder 6. These stanchions may be placed midway between the frames to which the outer ends of the bulkheads are secured. On reference to Fig. 1 it will be noted that the bulkheads, as there illustrated, may be regarded as forming two series, one adjacent each side of the vessel, the corresponding members of the two series converging to points adjacent the center, thereby forming compartments which are symmetrical with reference to the central longitudinal plane of the vessel. This view and Fig. 2 show the general arrangement preferred, 7 being the engine space, 8 the fuel tank, 9 the hold, 10 the center compartments, 11 the side compartments and 12 the usual expansion tanks.

Figure 3:
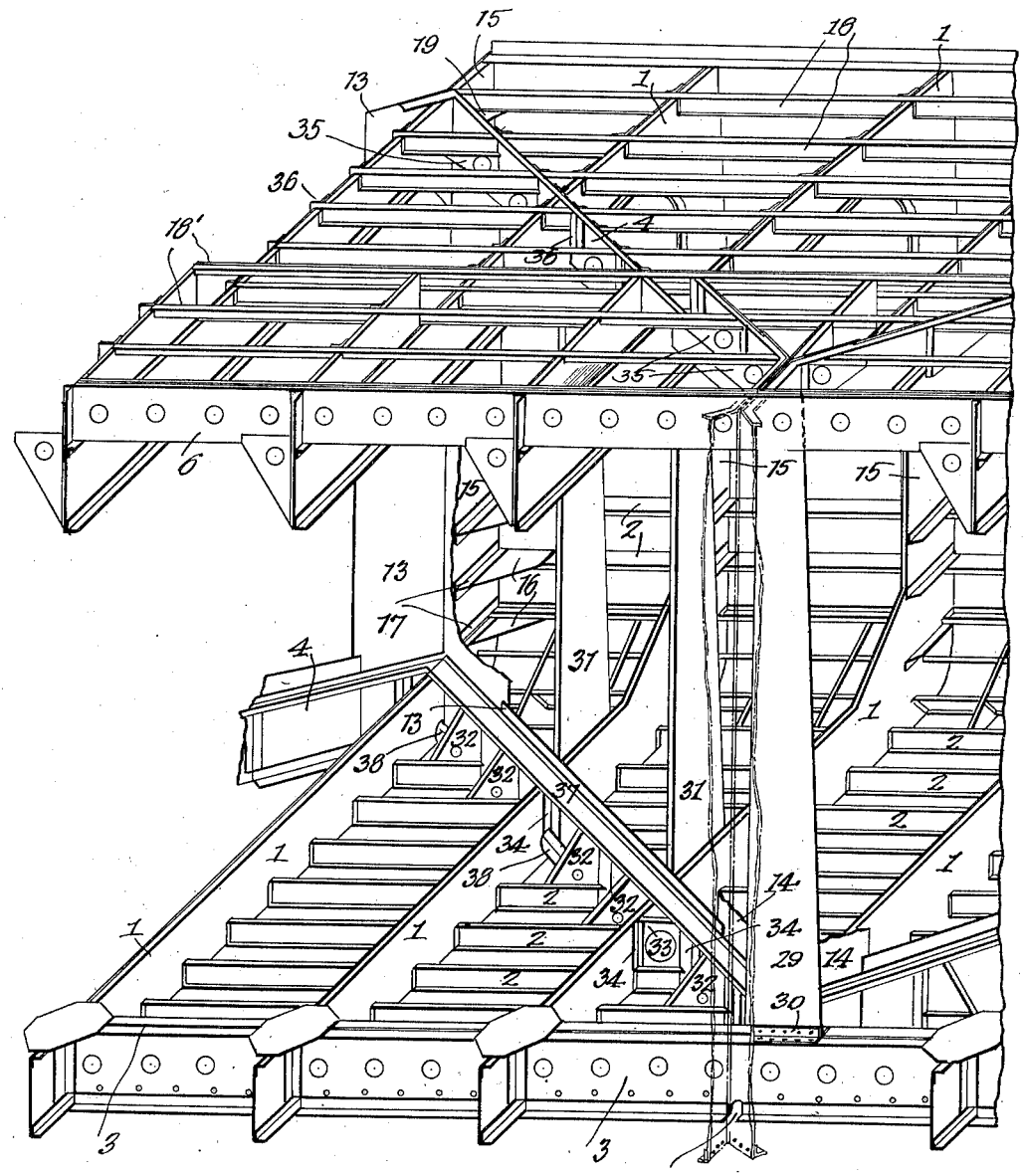
Fig. 3 is a perspective view showing a portion of the interior framing of the vessel and illustrating the relation of the slanting bulkheads to adjacent parts of the framing.

Referring to the remaining figures for the preferred details of construction, the bulkheads 4, although for convenience designated as a whole by this numeral, are best made up of a principal plate 4 and end plates 13 and 14 secured thereto. The plates 13 are shown as overlapping the side webs 15 of the transverses 1 and are riveted thereto. The side webs 15 are braced on each side by pairs of stiffening plates 16 secured to the adjacent longitudinals 2, angles 17 extending across said webs and associated with said stiffening plates being shown in Figs. 3 and 5. On reference to Fig. 4 on which appear the deck longitudinals 18 it will be seen that pairs of stiffening plates 19 extend from the adjacent longitudinal to the plates 13 and that pairs of angles 20 extend across the side webs 15 onto the plates 13. It will be understood, of course, that while this is a desirable arrangement other suitable structural details may be substituted. The plates 14 at the inner ends of the bulkheads are preferably flanged as indicated at 21 and may be secured adjacent the bend to the stanchion 10 by narrow plates 22 fitting the bend as shown in Figs. 5 and 6. This construction is repeated for the opposite pair of plates 14 and all four plates 14 and the stanchion 5 may be riveted together on each side of the center line, strips 23 being suitably used for this purpose. The four plates 14 and the stanchion 5 may be riveted together in shop and dropped into place as a unit, being cut out at the bottom and top to fit over the keelson and to permit the top girder to be dropped into place. The cut outs at the top are shown clearly in Fig. 7 where they are indicated by the reference numeral 24. The angles 25 at the top of the bulkheads stop at each side of the cut-outs 24 and their horizontal flange is omitted at 26 adjacent their ends to receive the upper flanges of the girder 6 which has a section of its lower angle omitted at 27 to permit it to be dropped into the space provided by the cut-outs and allow room for the plates. The angles at the bottom of the keelson, as indicated at 28, have a section removed to receive the plates. It will be observed that the plate 5 extends an equal distance on each side of the keelson. This central structure is further strengthened by an upright 29 secured at the bottom to the keelson 3, as, for instance, with the aid of an angle 30 and to the back of the center girder 6, the bottom angle at the back of the said girder or a part of it being omitted. Other uprights 31 act as vertical braces for the bulkheads, being secured to the transverses along the path of the bulkhead, thus materially increasing the stiffness of the bulkheads. As shown in Fig. 3 the bulkheads are braced at the bottom by brackets 32 secured to the longitudinals 2 and to the bulkheads. Other suitable braces, as plate 33 and angles 34, may be provided where desirable. The longitudinals 2 may stop at each side of the bulkhead or may continue through it, neither arrangement being novel. The bulkheads are secured at the top to the transverses 1 and to the deck longitudinals 18 and the expansion tank longitudinals 18' as well as to the center girder 6 and the side webs 15. Brackets 35 and angles 36 may be used for this purpose. Angles 36 may also be secured to the transverse frames 1 and the longitudinals 18. In addition to the bracing and strengthening means already described, the bulkheads are still further stiffened by the use of channel irons 37 which I have shown as parallel and horizontal. At the bottom of the bulkheads are angles 38.

It will be understood that the structural details may be considerably varied, the employment in a cargo vessel of slanting bulkheads being the characteristic feature of my invention. Where the cargo is liquid the bulkheads are fitted liquid tight, thus producing liquid tight compartments.

What I claim as my invention is:

1. A cargo vessel having transverse frames, center stanchions, and slanting bulkheads running straight from opposite frames to one of said stanchions and back to opposite frames throughout the major portion of the cargo hold.

2. A cargo vessel having transverse frames and longitudinals, a series of stanchions secured to the center longitudinal or keelson, a series of bulkheads secured to the framing adjacent one side of the vessel, and a corresponding series of bulkheads secured to the framing adjacent the opposite side of the vessel, corresponding members of said two series slating inward, in planes cutting the planes of both the longitudinals and the frames to adjacent stanchions, and rigidly secured to frames, longitudinals and stanchions.

3. A cargo vessel having transverse frames and longitudinals and deck transverses and longitudinals, a series of stanchions secured to the center longitudinal or keelson and to the center deck longitudinal, and a plurality of pairs of bulkheads built into said framing, lying in planes at angles to the transverse frames and longitudinals, slanting inward from opposite points at the sides of the vessel to adjacent stanchions and secured thereto.

4. A cargo vessel having transverse frames and longitudinals, a series of stanchions secured to the center longitudinal or keelson and projecting at each side thereof, and slanting bulkheads running straight from opposite frames to one of said stanchions and back to opposite frames throughout the major portion of the cargo hold, and secured to the projecting portions of said stanchions.

Port Huron, Mich., May 26, 1916.

JAMES J. LYNN.

Witnesses:
   THOS. WELLMAN,
   M. P. ELLIOTT.